US009304923B2

(12) United States Patent  (10) Patent No.: US 9,304,923 B2
Tune  (45) Date of Patent: Apr. 5, 2016

(54) DATA COHERENCY MANAGEMENT

(71) Applicant: ARM LIMITED, Cambridge (GB)

(72) Inventor: Andrew David Tune, Sheffield (GB)

(73) Assignee: ARM Limited, Cambridge (GB)

( * ) Notice: Subject to any disclaimer, the term of this patent is extended or adjusted under 35 U.S.C. 154(b) by 467 days.

(21) Appl. No.: 13/795,680

(22) Filed: Mar. 12, 2013

(65) Prior Publication Data

US 2014/0281180 A1    Sep. 18, 2014

(51) Int. Cl.
  *G06F 12/00*    (2006.01)
  *G06F 12/08*    (2006.01)

(52) U.S. Cl.
  CPC ........ *G06F 12/0817* (2013.01); *G06F 12/0808* (2013.01); *G06F 12/0831* (2013.01); *G06F 12/0833* (2013.01); *G06F 12/0864* (2013.01); *G06F 12/0895* (2013.01)

(58) Field of Classification Search
  CPC ............ G06F 12/0822; G06F 12/0826; G06F 12/0828; G06F 12/0831; G06F 12/0833
  See application file for complete search history.

(56) References Cited

U.S. PATENT DOCUMENTS

| 4,622,631 A * | 11/1986 | Frank et al. | |
| 2003/0093630 A1* | 5/2003 | Richard et al. | 711/154 |
| 2006/0224838 A1* | 10/2006 | Blumrich et al. | 711/146 |

OTHER PUBLICATIONS

A. Moshovos et al, "JETTY: Filtering Snoops for Reduced Energy Consumption in SMP Servers" Proceedings of the Seventh International Symposium on High-Performance Computer Architecture (HPCA'01), Jan. 2001, 12 pages.
C.S. Ballapuram et al, "Exploiting Access Semantics and Program Behavior to Reduce Snoop Power in Chip Multiprocessors" Proceedings of the 13th International Conference on Architectural Support for Programming Languages and Operating Systems, ASPLOS'08, Mar. 2008, pp. 60.
V. Salapura et al, "Design and Implementation of the Blue Gene/P Snoop Filter" HPCA, 2008, pp. 5-14.
M. Ekman et al, "TLB and Snoop Energy-Reduction using Virtual Caches in Low-Power Chip-Multiprocessors" Proc. of ACM ISLPED'02, Aug. 2002, pp. 243-252.
J.F. Cantin et al, "Improving Multiprocessor Performance with Coarse-Grain Coherence Tracking" Proceedings of the 32nd Annual International Symposium on Computer Architecture, Jun. 2005, 12 pages.
A. Patel et al, "Energy-Efficient MESI Cache Coherence with Pro-Active Snoop Filtering for Multicore Microprocessors" ISLPED'08, Aug. 2008, pp. 247-252.
A. Moshovos, "RegionScout: Exploiting Coarse Grain Sharing in Snoop-Based Coherence" SIGARCH Comput. Archit. News 33, 2, May 2005, 12 pages.
J. Zebchuk et al, "A Framework for Coarse-Grain Optimizations in the On-Chip Memory Hierarchy" Proceedings of the 40th Annual IEEE/ACM International Symposium on Microarchitecture, Dec. 2007, 13 pages.
D. Kim et al, "Subspace Snooping: Filtering Snoops with Operating System Support" 19th International Conference on Parallel Architectures and Compilation Techniques PACT' 10, Sep. 2010, 12 pages.
N. Agarwal et al, "In-Network Coherence Filtering: Snoopy Coherence without Broadcasts" *MICRO* '09, Dec. 2009, pp. 232-243.

* cited by examiner

*Primary Examiner* — Reginald Bragdon
*Assistant Examiner* — Thanh Vo
(74) *Attorney, Agent, or Firm* — Nixon & Vanderhye P.C.

(57) ABSTRACT

A data processing systems employing a coherent memory system comprises multiple main cache memories. An inclusive snoop directory memory stores directory lines. Each directory line includes a directory tag and multiple snoop vectors. Each snoop vector relates to a span of memory addresses corresponding to the cache line size within the main cache memories.

22 Claims, 3 Drawing Sheets though, be restricted. For example, the snoop vectors may indicate one or more clusters of main cache memories each of which includes one or more of the main cache memories as storing data corresponding to the respective memory address region concerned.

DATA COHERENCY MANAGEMENT

This Invention relates to the field of data processing systems. More particularly, this invention relates to the field of data coherency management within such data processing systems.

BACKGROUND

It is known to provide data processing systems in which data from a given memory address may be stored at multiple locations. As an example, in a symmetric multi-processing (SMP) system each of the processors may have a local cache memory storing a copy of an item of data. If one of these processors updates its local copy of that item of data, then the other copies of that data item stored in other local caches, and within the main memory system, will be out-of-date. In order to deal with this issue, it is known to provide such systems with snoop mechanisms whereby, for example, when a processor is fetching an item of data (such as a cache line into its local cache), then snoop requests may be broadcast within the system to determine where the most up-to-date copy of that data item exists. Thereafter snoop request sent between local caches ensure the necessary degree of coherency is maintained between local copies. Broadcast snoop requests are also associated with, for example, coherent write accesses and cache maintenance operations.

While such snoop mechanisms are effective in maintaining data consistency/coherence, there is a problem that as the number of locations at which a data item can be stored increases and the number of potential consumers of those data items increases, then there is a geometric increase in the amount of snoop request traffic that is generated. One approach to reduces this snoop request traffic is to use snoop filters. Various types of snoop filter are known such, as Bloom filters, exclusive snoop directories and inclusive snoop directories. An exclusive snoop directory stores data specifying which regions of memory are known not to contain any shared data that is stored in more than one location. A hit within an exclusive snoop directory indicates that data from the memory address concerned is not shared (i.e. not already present within both the main memory and a cache memory) and accordingly may be safely fetched from the main memory without raising a coherence issue. An inclusive snoop filter stores data indicating which memory addresses correspond to data items that are shared (e.g. stored within at least one local cache memory as well as within the main memory). A hit within an inclusive snoop directory indicates that the corresponding data may not simply be fetched from the main memory and a check needs to be made as to whether or not a more up-to-date copy of that data is stored elsewhere within the system in order to ensure proper data coherence.

A problem with snoop filters is to reduce the amount of overhead that they incur in terms of circuit area, dynamic power consumption and static power consumption (e.g. leakage). In the case of exclusive snoop directories a typical system normally has an overwhelming proportion of its memory addresses corresponding to data that is not shared rather than data that is shared. Thus, in order to obtain full coverage of the memory address space at a level of granularity that does not introduce too much imprecision resulting in false an unacceptable level of false requirements for snoop requests, a disadvantageously large amount of storage needs to be provided for an exclusive snoop directory. Such a large amount of storage consumes circuit area thereby increasing cost as well as incurring significant dynamic and static power consumption penalties. In the case of an inclusive snoop directory, as this is required to track the data stored within all of the local stores (e.g. cache memories) of a system, it too may incur a significant area and power consumption cost as the size of the local data stores within the system increases.

SUMMARY

Viewed from one aspect the present invention provides apparatus for processing data comprising:
a plurality of main cache memories each having a plurality of main cache lines;
an inclusive snoop directory memory having a plurality of directory lines, each of said directory lines respectively storing:
(i) a given directory tag value indicative of a contiguous range of memory address values with a given span corresponding in size to N main cache lines, where N is an integer greater than one; and
(ii) N snoop vectors, each of said N snoop vectors indicating at least that, for a respective one of N memory address sub-regions within said given span, one or more of said plurality of main cache memories is logged as storing data corresponding to said respective one of N memory address regions.

The present technique recognises that there is typically a significant degree of spatial coherence between the memory addresses that are stored within local caches (i.e. if a given memory address is stored within one of the caches, then there is an increased likelihood that nearby memory addresses will also be cached). Furthermore, the present technique recognises that compared to a normal cache memory the ratio between the size of the tag value stored to identify the memory address range concerned and the quantity of associated payload data differs considerably. The flag data typically stored within an inclusive snoop directory to indicate the location of locally stored data is considerably smaller than the data itself which will be stored within the local memories, such as the main cache memories. The present techniques provide a system in which the directory lines within an inclusive snoop directory memory each refer to multiple main cache lines within the main cache memories (i.e. correspond to a greater span of memory addresses consistent with spatial coherence) as well as containing multiple snoop vectors each relating to a different memory address sub-region covered by the directory tag value for that directory line (such as corresponding to different main cache lines). The present technique thus breaks the one-to-one relationship between directory lines within an inclusive snoop directory and main cache lines within the plurality of main cache memories. This produces a more compact and efficient inclusive snoop directory with a lower area and power overhead while maintaining effectiveness in being able to cope with the typical degree of data sharing within real life processing workloads.

The snoop vectors indicate that at least one of the plurality of main cache memories is logged as storing data corresponding to a respective one of the N memory address regions. It may be that despite the data being indicated (logged) as shared by the inclusive snoop directory, in fact an event, such as a silent eviction, has occurred and the data is not currently shared (i.e. stored in at least one of the main cache memories as indicated). Such imprecision is safe as a hit within the inclusive snoop directory can trigger snoop requests that will return the correct result concerning the shared status of a given item of data.

It may be that the snoop vectors merely indicate that the data is shared somewhere within the system, but give no indication of where. The actual location of the sharing may be determined by subsequent snoop requests. It is also possible that the snoop vectors could give partial or compressed location data, such as indicating one specific location where the data is shared and together with indication that the data is or is not present in one or more further locations (main cache memories). However, the ratio between the directory tag size and the snoop vector size is such that it is relatively easy and efficient to provide snoop vectors which indicate which ones of the plurality of main cache memories are logged as storing data corresponding to a respective one of the N memory address regions. Thus, the snoop vectors can indicate the particular main cache memories to which snoop requests need to be sent in order to maintain the data coherence (e.g. requests to invalidate local copies, etc). This avoids the need to send unnecessary requests to main cache memories that do not contain the data (thereby saving power).

The speed of operation and efficiency of the inclusive snoop directory memory may be enhanced by the provision of an inclusive snoop directory buffer coupled to the inclusive snoop directory memory. Such an inclusive snoop directory buffer may be configured to store recently accessed ones of the plurality of directory lines such that such recently accessed directory lines can be looked up within the snoop directory buffer rather than within the snoop directory memory. The buffer itself is not inclusive as it is too small, but the snoop directory is inclusive.

The snoop directory buffer may be formed of registers permitting high speed, parallel access to all of the entries within the snoop directory buffer. Furthermore, a lookup in the snoop directory memory may be avoided in a high proportion of cases due to the temporal locality with which directory lines are accessed thereby resulting a high probability that a directory line sought will be stored within the inclusive snoop buffer. In practice the cache lines have little or no temporal locality, but do have spatial locality. The wider directory lines, as a consequence, do have some temporal locality.

The primary eviction mechanism from the snoop directory memory is when the caches signal that they have evicted a cache line and the snoop filter marks that line as not present. When all of the snoop vectors in a directory line are indicating "not present", then the snoop directory can evict that directory line. It may in some other circumstances be necessary to evict a directory line from the snoop directory memory (e.g. if there are conflicts for position due to set associativity in the directory or due to overflow following a large number of silent evictions by the caches.) In this case, the snoop control circuitry may invalidate any cache lines stored within one or more of the plurality of main cache memories corresponding to the evicted directory line. The victim selection from the snoop directory memory may be, for example, based upon a pseudo-random replacement policy.

Whilst it would be appreciated that the number of snoop vectors per directory line can vary, it has been found that particularly useful numbers of snoop vectors per directory line are powers of 2, particularly 4 and 8.

As previously mentioned, the snoop vectors could take a variety of different forms, such as forms indicating that at least one of the plurality of main cache memories contains a cache line within the memory region concerned, but without specifying which of the main cache memories holds that line. However, efficiency can be improved and unnecessary snoop requests avoided when the snoop vectors comprise a flag indicating for each of the main cache memories whether or not it is logged as storing data corresponding to the respective memory address region of that snoop vector. The snoop directory could store more information, such as the cache state of the cache lines it monitors. For example, it might store when cache lines are in a state when they can be written to (i.e. may be "dirty"). This would means that the technique could further reduce the number of snoops required when there is a lot of true sharing (that is, then the same cacheline is in more than one cache) by only snooping the cache that may contain dirty data The inclusive snoop directory memory could have a variety of different forms. One form well suited to the volume of data concerned is an SRAM memory. This SRAM memory may in some embodiments be configured as set associative memory that is indexed using a portion of the memory address associated with the memory access being checked. This index may be derived from the portion of the memory address using a hashing function (or potentially a different hashing function for each way of the set associated SRAM) in order to improve the spread of the directory lines in the inclusive snoop directory memory in a way that reduces aliasing issues and the like.

In order that the inclusive snoop directory memory should have sufficient capacity to store directory line data for the contents of all of the plurality of main cache memories, in some embodiments the number of directory lines may be greater than the total number of lines within the main cache memories. In order to provide sufficient capacity within the inclusive snoop directory memory to avoid evictions therefrom in all but unusual cases it has been found that the number of snoop vectors within the directory lines should be greater than or substantially equal to twice the total number of cache lines within the plurality of main cache memories.

The system will typically include a main memory from which the plurality of main cache memories cache data. The plurality of main cache memories can in fact be cache memories located at any point within the memory hierarchy of a particular system.

Main memories of high capacity are typically formed having memory rows whereby when the same memory row is accessed sequentially more rapid access is achieved. The main memory may be matched to the memory system as a whole, including the inclusive snoop directory memory by providing that the memory rows of the main memory correspond in size to a contiguous range of memory addresses greater than or equal in size to the number of main cache lines which are tracked by a single directory line within the inclusive snoop directory memory.

Viewed from another aspect the present invention provides apparatus for processing data comprising:

a plurality of main cache memory means for storing data, each one of said plurality of main cache memory means having a plurality of main cache lines;

inclusive snoop directory memory means for storing snoop directory data, said inclusive snoop directory memory means having a plurality of directory lines, each of said directory lines respectively storing:

(i) a given directory tag value indicative of a contiguous range of memory address values with a given span corresponding in size to N main cache lines, where N is an integer greater than one; and (ii) N snoop vectors, each of said N snoop vectors indicating at least that, for a respective one of N memory address sub-regions within said given span, one or more of said plurality of main cache memory means is logged as storing data corresponding to said respective one of N memory address regions.

Viewed from a further aspect the present invention provides a method of processing data comprising the steps of:

storing data within a plurality of main cache memories, each one of said plurality of main cache memories having a plurality of main cache lines;

storing snoop directory data within an inclusive snoop directory memory, said inclusive snoop directory memory having a plurality of directory lines, each of said directory lines respectively storing:
- (i) a given directory tag value indicative of a contiguous range of memory address values with a given span corresponding in size to N main cache lines, where N is an integer greater than one; and
- (ii) N snoop vectors, each of said N snoop vectors indicating at least that, for a respective one of N memory address sub-regions within said given span, one or more of said plurality of main cache memories is logged storing data corresponding to said respective one of N memory address regions.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
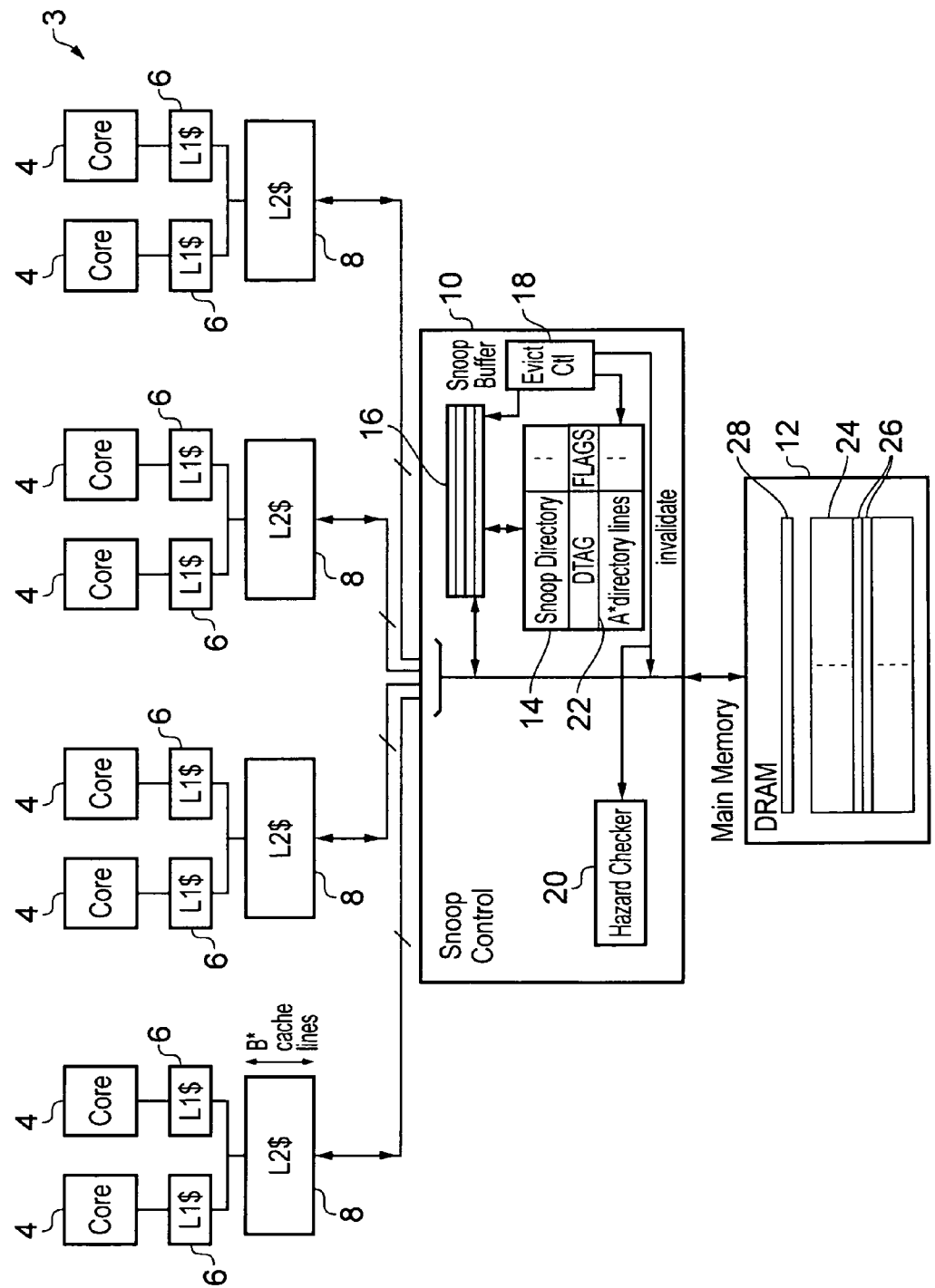
FIG. 1 schematically illustrates a data processing system including a memory hierarchy incorporating an inclusive snoop directory system.

FIG. 1 schematically illustrates a data processing system 3 that supports symmetric multiprocessing. Eight processor cores 4 are each provided with respective level 1 cache memories 6 (there could, in other embodiments, be two level 1 caches per core—one for data and one for instructions). The level 1 cache memories 6 for a pair of cores 4 share a level 2 cache memory 8. In this example embodiment, an inclusive snoop directory memory 14 that is part of a snoop filter serves to manage data coherence between the level 2 cache memories 8 (plurality of main cache memories).

Snoop control circuitry 10 is connected to the level 2 cache memories 8 and serves to receive memory access requests issued to a main memory 12 when a cache miss occurs within one of the level 2 cache memories. The snoop control circuitry may also receive other memory requests, such as coherent writes or cache maintenance operations (invalidate, clean etc). The cache misses trigger a cache line fill with data for a full main cache line being returned from the main memory 12 to the level 2 cache memory 8 when the data of that cache line is not currently being shared (i.e. is present within) one of the other level 2 cache memories.

The snoop control circuitry 10 serves to examine a received memory access request (or other cache maintenance operation) and determine using the inclusive snoop directory memory 14, and an associated inclusive snoop directory buffer 16, whether or not a cache line being requested to be fetched from the main memory 12 is already stored within one of the other level 2 cache memories 8 different from the level 2 cache memory 8 which suffered the cache miss. If a miss occurs within the inclusive snoop directory memory 14 (and the inclusive snoop directory buffer 16), then this indicates that the cache line concerned is not shared (i.e. is not already present within one of the other level 2 cache memories 8) and accordingly the cache line will be fetched from the main memory 12 into the level 2 cache memory 8 which suffered the cache miss. If a hit occurs within the inclusive snoop directory memory 14 (or the inclusive snoop directory buffer 16), then this indicates that the cache line concerned is already present within one of the other level 2 cache memories 8 and snoop requests are then sent from the snoop controller 10 to the relevant level 2 cache memories 8 which are indicated by the snoop vectors within the inclusive snoop directory memory 14 as storing copies of the cache line concerned. The snoop requests (in this case for memory reads) can serve to determine which is the most up-to-date copy of the cache line available and return this to the original requesting level 2 cache memory 8. This snoop request may also invalidate some of the existing copies of the cache line as appropriate. The action of snoop requests in managing data coherence within a system such as that illustrated in FIG. 1 will be familiar to those in this technical field and any of these techniques for coherency control (e.g. MESI, MOESI, ESI, MEI etc) using snoop requests may be employed. The inclusive snoop directory memory 14 may be similarly used in respect of coherent writes and cache maintenance operations to reduce the amount of snoop traffic generated.

The inclusive snoop directory memory 14 may be formed as an SRAM memory having multiple ways (i.e. set associative). These ways may be addressed using an index value derived from a portion of the memory address of the memory access request being tested. The index value may be derived from the memory address using a hash function. This hash function may differ for different ways within the SRAM.

The inclusive snoop directory buffer 16 may be formed as a plurality of registers giving relatively high speed and parallel access to their contents. Each register within the inclusive snoop directory buffer 16 will hold a directory line. Similarly, each row within the inclusive snoop directory memory 14 will hold a directory line.

When a memory access request is received from one of these level 2 cache memories 8, then it is first checked against the directory tags of the directory lines within the inclusive snoop directory buffer 16. There are three possible results from the inclusive snoop directory buffer 16:

(1) cacheline address present and hit, i.e. non-zero snoop vector (meaning cacheline is data is at least one cache)

(2) cacheline address present but miss, i.e. cacheline address is in the a directory line region, but the snoop vector is null (meaning cacheline is data not in any cache). In this case the inclusive snoop directory memory 14 does not need to be accessed. This is a benefit of the inclusive snoop directory buffer 16 because it gives fast, low-power misses to many cacheline addresses. For example, a miss to a first cacheline address will have required an inclusive snoop directory memory 14 access but an access to a second cacheline address in the same directory line address region will only require an inclusive snoop directory buffer 16 access, not an inclusive snoop directory memory 14 access.

(3) cacheline address not present, i.e. the snoop directory buffer 16 does not know anything about this cacheline. In this case, the inclusive snoop directory memory 14 needs to be accessed and the line is allocated to the inclusive snoop directory buffer 16, even if not present in the inclusive snoop directory memory 14. If it was not present in the inclusive snoop directory memory 14, an entry with null snoop vectors is made in the inclusive snoop directory buffer 16. The line will be allocated from the inclusive snoop directory memory 14 into the inclusive snoop directory buffer 16 depending on the replacement policy. Although LRU is normally used, the system may not allocate certain types of request, e.g. if it is predicted that they will not have a lot of spatial locality.

If there is a hit within the inclusive snoop directory buffer 16, as in (1) above, then the snoop vectors of the directory line concerned are used to determine whether or not the cache line which would be fetched by that access is in fact already stored within one of the other level 2 cache memories 8. If it is stored within one of the other level 2 cache memories 8, then snoop requests are triggered as previously mentioned.

If there is no hit within the inclusive snoop directory buffer 16, then the memory address of the memory access concerned is used to derive an index value (using a hash function which differs for each way) that looks up within the inclusive snoop directory memory 14 to determine whether the directory tags within any of the directory lines so indexed matches the address of the memory access concerned. If there is a hit, then this indicates that the cache line concerned is already present within one of the other level 2 cache memories 8 and accordingly data coherence is managed using snoop requests. If there is no hit, then the memory access can proceed to be serviced from the main memory 12.

If there is no hit, then a new entry needs to be made within the inclusive snoop directory buffer 16. If there is no free space (empty slot) within the inclusive snoop directory buffer 16, then eviction control circuitry 18 serves to select a pseudo least recently used directory line from within the inclusive snoop directory buffer 16 and move this into the inclusive snoop directory memory 14. If there is no empty directory line available within the inclusive snoop directory memory 14, then the eviction control circuitry 18 may use a pseudo random replacement policy to evict one of the directory lines from the inclusive snoop directory memory 14. An evicted directory line from the inclusive snoop directory memory 14 has nowhere else to be stored and accordingly tracking of its associated cache lines will be lost when it is evicted from the inclusive snoop directory memory 14. Accordingly, if such an eviction occurs, then an invalidate signal is raised which triggers snoop requests to the level 2 cache memories 8 concerned which are holding the cache lines for which the directory line is being evicted and trigger those cache lines to be cleaned, if dirty, and marked as invalid within the level 2 cache memory 8 concerned. This invalidate signal is also passed to hazard checking circuitry 20 which monitors completion of the invalidate operation so as to avoid deadlocks and other hazards which could arise due to, for example, a memory access request arising for a memory region which has just been subject to an operation in which its directory line was evicted from the inclusive snoop directory memory 14 and accordingly the data has not yet been invalidated (or cleaned) back into the main memory 12. Intermediate buffers (not illustrated) may be provided to store lines evicted from the inclusive snoop directory main memory 14 (and possibly the inclusive snoop directory buffer 16). These do not change the overall function, but can increase performance.

FIG. 1 illustrates a directory line 22 within the inclusive snoop directory memory 14. This directory line 22 includes a directory tag and a number of flags which together form N snoop vectors. The structure of a directory line will be discussed further in relation to FIG. 3. In the example illustrated, each of the level 2 cache memories has B cache lines. (it is also possible that different level 2 cache memories could have different numbers of cache lines). There are X level 2 cache memories, with in this case X=4. The inclusive snoop directory memory 14 is sized to have a number of directory lines A such that the number of snoop vectors provided, namely N*A is greater than B*X, more particularly, the number of snoop vectors N*A may be greater than or substantially equal to twice B*X. To give a more concrete example, if each of the level 2 cache memories 8 were to contain 1024 cache lines and each directory line stores 4 vectors, then the inclusive snoop directory memory may be formed to contain 2048 directory lines.

The main memory 12 is formed to include a memory bank 24 including a plurality of memory rows 26. If the main memory 12 is a DRAM memory, then one memory row 26 will be read at a time into a row buffer 28 from which more rapid subsequent access to the data concerned may be made once the data has been read into the row buffer 28. The system may be balanced such that the memory span of the row buffer 28 is at least as large as the span of memory addresses represented by the N snoop vectors of one of the directory lines 22.

Figure 2:
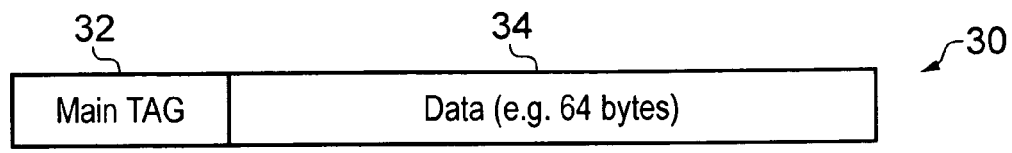
FIG. 2 schematically illustrates a main cache line.

FIG. 2 schematically illustrates a main cache line 30. This main cache line includes a tag 32 and corresponding data 34 read from memory locations within the main memory 12 corresponding to the tag 32. The ratio between the size of the tag 32 and the data 34 is one in which the tag 32 is considerably smaller than the data 34.

Figure 3:
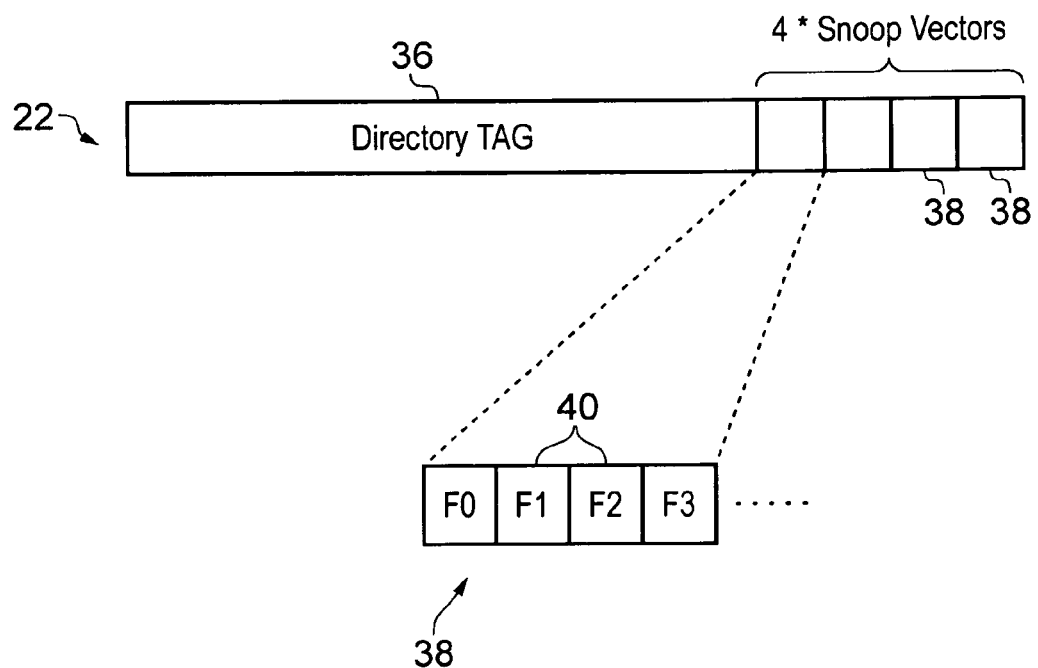
FIG. 3 schematically illustrates a directory line.

FIG. 3 schematically illustrates a directory line 22 which includes a directory tag 36 and N snoop vectors 38. In this case there are four snoop vectors. Each of these N snoop vectors corresponds to a span of memory addresses with a size matching the span of memory addresses associated with a respective one of the cache lines 30 within the level 2 caches 8. Accordingly, in this example a single directory line 22 stores N snoop vectors 38 that together correspond to a span of memory addresses with a size equal to that of four cache lines 30.

Nevertheless, the relative size of the directory tag 36 is generally larger than the N snoop vectors 38.

Each of the snoop vectors 38 comprises a plurality of flags 40. Each flag 40 indicates whether or not an associated one of the level 2 cache memories 8 is storing a cache line of data corresponding to the range of memory addresses indicated by the directory tag 36 and the corresponding position of the snoop vector 38 within the N snoop vectors 38 provided by the directory line 22. If the flag 40 is set, then this indicates that the level 2 cache 8 concerned is logged as storing data for the range of memory addresses for the snoop vector 38 within one of its cache lines 30. It may be that a process, such as a silent eviction, will mean that the data is not actually present within the level 2 cache memory 8, but the directory line 22 indicates that it is present and triggers snoop requests as appropriate. The snoop requests may determine the true state and that the cache line has in fact been evicted or invalidated in some other way.

The inclusive directors' system 14, 15 may also store other kinds of data, such as the coherency state of each cacheline. For example, the system may store information about if the line is in the "owned" or "exclusive" state. This may help to reduce the number of snoops when there is a higher degree of true sharing.

In other embodiments an individual flag per level 2 cache within each snoop vector 38 may not be provided. A single flag may be used to indicate that one of the level 2 cache memories 8 contains a copy of the data concerned and then the triggered snoop requests may be sent to all of the level 2 caches to determine which of them contains the data. The use of individual flags enables the snoop requests to be targeted at the level 2 caches 8 which are indicated as actually containing the data and thereby save power.

Figure 4:
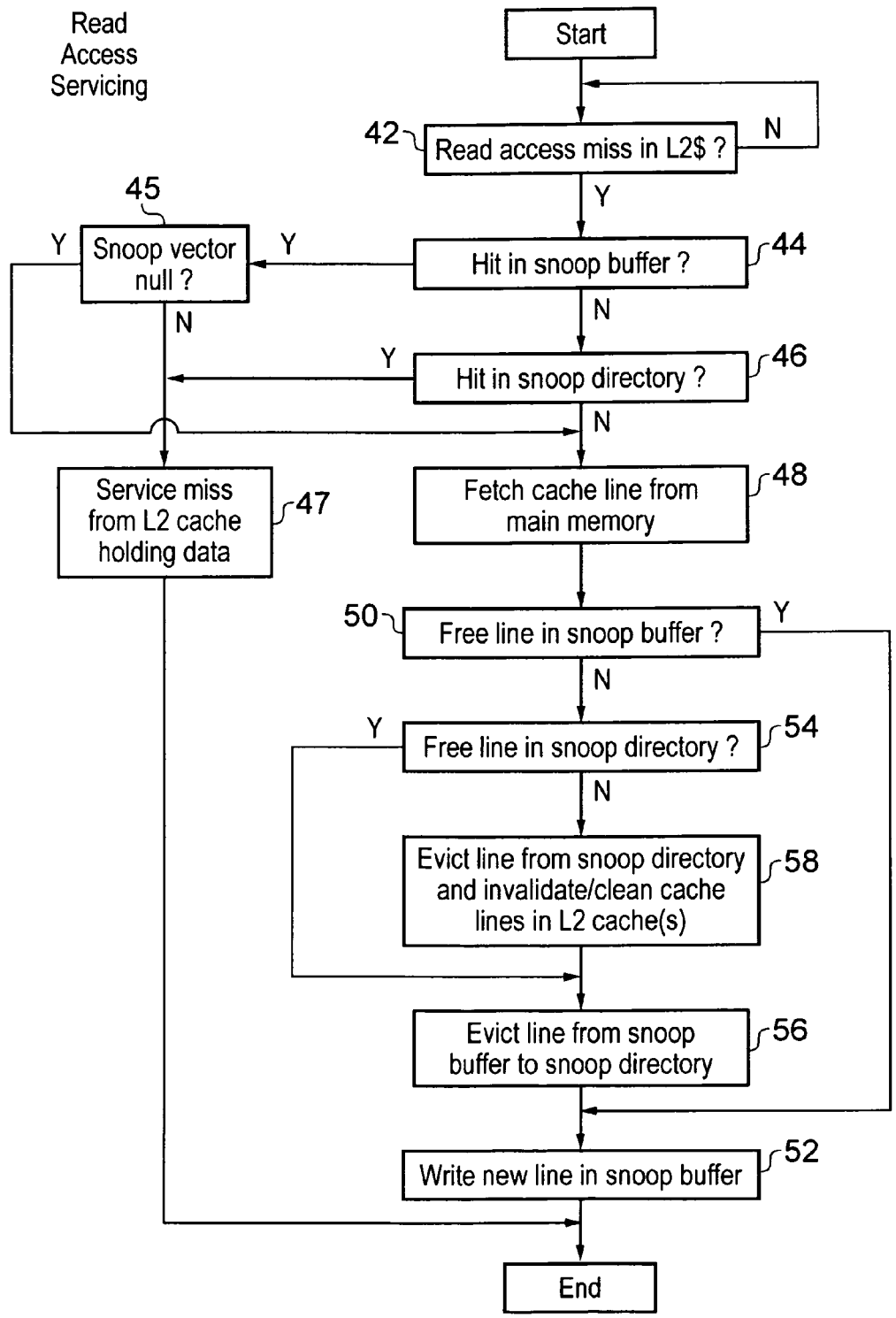
FIG. 4 is a flow diagram schematically illustrating the operation of the inclusive snoop directory system for coherent reads.

FIG. 4 is a flow diagram schematically illustrating the action of the inclusive snoop directory buffer 16, the inclusive snoop directory memory 14 and the eviction circuitry 18 when handling a read access. At step 42 processing waits until a read access miss occurs within one of the level 2 cache memories 8. Step 44 then determines whether there is a hit within the registers of the inclusive snoop directory buffer 16 (using a parallel lookup). If there is a hit, then processing proceeds to step 45 where it is determined whether the snoop vector is null, i.e it is known that none of the cache memories 8 is storing the data concerned. If the snoop vector is null, processing proceeds to step 48, otherwise processing proceeds to step 47 where the miss is serviced from the level 2 cache 8 containing a copy of the data concerned in the normal way using snoop requests issued to the level 2 cache. Other actions at step 47 are possible, such as the invalidation of the other copy of the data prior to the data being given to the requesting level 2 cache for exclusive access by that requesting level 2 cache. These variations will be familiar to those in this technical field.

If no hit occurs at step 44, then step 46 determines whether or not there is a hit within the inclusive snoop directory memory 14. If there is a hit, then processing again proceeds to step 47. If there is no hit, then step 48 serves to fetch the cache line and memory concerned from the main memory 12.

At this stage in the processing a new directory line entry is formed. Step 50 determines whether there is a free line available in the inclusive snoop directory buffer 16. If there is such a free line available, then processing proceeds to step 52 where the new directory line is written into the free line of the inclusive snoop directory buffer 16. If there is no free line determined at step 50, then processing proceeds to step 54 where a determination is made as to whether or not there is a free line available in the inclusive snoop directory memory 14 (which may depend on the organisation of the inclusive snoop directory memory, e.g. set associativity). If there is such a free line available, then processing proceeds to step 56 where a line is evicted from the inclusive snoop directory buffer 16 into the free line of the inclusive snoop directory memory 14 so as to free up a space within the inclusive snoop directory buffer 16 prior to processing proceeding to step 52. If no free line is detected at step 54, then processing proceeds to step 58 where a line is evicted from the inclusive snoop directory memory 14. At the same time, the corresponding cache lines pointed to by the newly evicted directory line are validated, cleaned from the level 2 cache memories 8 holding them as the snoop vectors tracking their coherence are lost by the eviction. Processing then proceeds to steps 56 and 52.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a plurality of main cache memories each having a plurality of main cache lines;
an inclusive snoop directory memory having a plurality of directory lines, each of said directory lines respectively storing:
(i) a given directory tag value indicative of a contiguous range of memory address values with a given span corresponding in size to N main cache lines, where N is an integer greater than one; and
(ii) N snoop vectors, each of said N snoop vectors indicating at least that, for a respective one of N memory address sub-regions within said given span, one or more of said plurality of main cache memories is logged as storing data corresponding to said respective one of N memory address sub-regions,
wherein:
said inclusive snoop directory memory comprises A directory lines, where A is a positive integer;
said plurality of main cache memories comprise X cache memories, where X is an integer greater than one;
each of said plurality of main cache memories comprises B main cache lines, where B is a positive integer; and
N*A is greater than X*B.

2. Apparatus as claimed in claim 1, wherein each of said N snoop vectors indicate, for a respective one of N memory address sub-regions within said given span, which ones of said plurality of main cache memories are logged as storing data corresponding to said respective one of N memory address sub-regions.

3. Apparatus as claimed in claim 1, wherein said inclusive snoop directory memory is part of snoop control circuitry configured to respond to an access request to a given cache memory of said plurality of main cache memories for data having a memory address that misses within said given cache memory to determine, as indicated by a hit within said inclusive snoop directory memory, if any other of said plurality of main cache memories is logged as storing data corresponding to said memory address.

4. Apparatus as claimed in claim 3, wherein said plurality of main cache memories and said snoop control circuitry are part of a coherent memory system.

5. Apparatus as claimed in claim 1, comprising an inclusive snoop directory buffer coupled to said inclusive snoop directory memory.

6. Apparatus as claimed in claim 5, wherein said inclusive snoop directory buffer is configured to store recently accessed ones of said plurality of directory lines.

7. Apparatus as claimed in claim 5, wherein said inclusive snoop directory comprises a plurality of registers each storing a directory tag and N snoop vectors.

8. Apparatus as claimed in claim 7, wherein said plurality of registers are configured to be accessed in parallel.

9. Apparatus as claimed in claim 3, wherein when evicting a directory line from said inclusive snoop directory memory, said snoop control circuitry invalidates any cache lines still stored within one or more of said plurality of main cache memories corresponding to said directory line.

10. Apparatus as claimed in claim 1, wherein $N = 2^Z$, where Z is an integer greater than or equal to one.

11. Apparatus as claimed in claim 10, wherein one of:
Z=2; and
Z=3.

12. Apparatus as claimed in claim 1, wherein said plurality of main cache memories comprise X cache memories, where X is an integer greater than one, and each of said N snoop vectors comprises X flags, each of said X flags indicating whether or not a corresponding one of said plurality of main cache memories is logged as storing data corresponding to said respective one of N memory address sub-regions.

13. Apparatus as claimed in claim 1, wherein each of said directory lines is configured to store data indicating if one or more cache memories may be storing dirty data for one or more of said N memory address sub-regions.

14. Apparatus as claimed in claim 1, wherein said inclusive snoop directory memory is an SRAM memory.

15. Apparatus as claimed in claim 14, wherein said SRAM memory is configured as a set associative memory.

16. Apparatus as claimed in claim 1, wherein A is greater than or substantially equal to 2*X*B.

17. Apparatus as claimed in claim 1, wherein said directory lines are accessed using a hashed index value dependent upon a portion of a memory address shared by said contiguous range of memory addresses with said given span.

18. Apparatus as claimed in claim 17, wherein said inclusive snoop directory memory comprises a plurality of memory ways and hashed index values used to access different ones of said plurality of ways use different hash functions.

19. Apparatus as claimed in claim 1, comprising a main memory having a plurality of memory rows and configured to provide more rapid access to a most recently accessed memory row than to other of said plurality of memory rows, each of said plurality of memory rows corresponding to a contiguous range of memory address values greater than or equal in size to N main cache lines.

20. Apparatus as claimed in claim 3, wherein said snoop control circuitry is configured to update said N snoop vectors of a given directory line to track which of said plurality of main cache memories is storing cache lines from said N memory address sub-regions.

21. Apparatus for processing data comprising:
   a plurality of means for storing data, each one of said plurality of means for storing having a plurality of main cache lines;
   means for storing snoop directory data having a plurality of directory lines, each of said directory lines respectively storing:
      (i) a given directory tag value indicative of a contiguous range of memory address values with a given span corresponding in size to N main cache lines, where N is an integer greater than one; and
      (ii) N snoop vectors, each of said N snoop vectors indicating at least that, for a respective one of N memory address sub-regions within said given span, one or more of said plurality of main cache memory means is logged as storing data corresponding to said respective one of N memory address sub-regions,
   wherein:
   said means for storing snoop directory data comprises A directory lines, where A is a positive integer;
   said plurality of means for storing data comprise X cache memories, where X is an integer greater than one;
   each of said plurality of means for storing data comprises B main cache lines, where B is a positive integer; and
   N*A is greater than X*B.

22. A method of processing data comprising the steps of:
   storing data within a plurality of main cache memories, each one of said plurality of main cache memories having a plurality of main cache lines;
   storing snoop directory data within an inclusive snoop directory memory, said inclusive snoop directory memory having a plurality of directory lines, each of said directory lines respectively storing:
      (i) a given directory tag value indicative of a contiguous range of memory address values with a given span corresponding in size to N main cache lines, where N is an integer greater than one; and
      (ii) N snoop vectors, each of said N snoop vectors indicating at least that, for a respective one of N memory address sub-regions within said given span, one or more of said plurality of main cache memories is logged storing data corresponding to said respective one of N memory address sub-regions,
   wherein:
   said inclusive snoop directory memory comprises A directory lines, where A is a positive integer;
   said plurality of main cache memories comprise X cache memories, where X is an integer greater than one
   each of said plurality of main cache memories comprises B main cache lines, where B is a positive integer; and
   N*A is greater than X*B.

\* \* \* \* \*